(12) United States Patent
Luxem et al.

(10) Patent No.: US 6,822,105 B1
(45) Date of Patent: Nov. 23, 2004

(54) METHOD OF MAKING ALKYL ESTERS USING GLYCERIN

(75) Inventors: Franz J. Luxem, Palatine, IL (US); Jenifer Heydinger Galante, Oakland, NJ (US); William M. Troy, Woodridge, IL (US); Randall R. Bernhardt, Antioch, IL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 10/639,048

(22) Filed: Aug. 12, 2003

(51) Int. Cl.[7] ............................................... C07C 51/00
(52) U.S. Cl. ....................................... 554/167; 554/156
(58) Field of Search ................................... 554/156, 157

(56) References Cited

U.S. PATENT DOCUMENTS

| | | |
|---|---|---|
| 4,695,411 A | 9/1987 | Stern et al. ............... 260/410.9 |
| 5,354,878 A | 10/1994 | Connemann et al. ....... 554/167 |
| 5,399,731 A | 3/1995 | Wimmer ...................... 554/167 |
| 6,399,800 B1 | 6/2002 | Haas et al. .................. 554/156 |

FOREIGN PATENT DOCUMENTS

| | | | |
|---|---|---|---|
| EP | 0591019 B1 | 8/1997 | ............. C11C/3/04 |
| EP | 0708813 B2 | 2/2001 | ............. C11C/3/04 |
| WO | WO02/28811 A1 | 4/2002 | ........... C07C/67/03 |
| WO | WO02/38529 A1 | 5/2002 | ........... C07C/69/24 |

*Primary Examiner*—Deborah D. Carr
(74) *Attorney, Agent, or Firm*—McAndrews, Held & Malloy Ltd.

(57) ABSTRACT

A method for making alkylesters, or methylester specifically, such as biodiesel, from an oil source is described. The method involves converting the free fatty acids of the oil source into a mixture of mono-, di-, and tri-glycerides and subsequently transesterifying the newly formed glycerides as well as the originally present glycerides into fatty acid alkyl esters.

18 Claims, 2 Drawing Sheets

METHOD OF MAKING ALKYL ESTERS USING GLYCERIN

BACKGROUND OF THE INVENTION

Alkylesters, or methylester specifically, such as biodiesel, are a clean-burning replacement for conventional petroleum-based diesel. Biodiesel may be made from natural, renewable sources such as new or used vegetable oils and animal fats. Biodiesel is fatty acid alkyl esters (typically being $C_{16}$ to $C_{18}$) and can generally be burned in combustion-ignition engines as a direct replacement for petroleum-based diesel. Aside from providing the benefit that biodiesel may be generated from renewable sources, biodiesel also provides the added benefit of decreased emissions from its combustion as compared to the combustion of petroleum-based diesel.

Alkylesters, in particular biodiesel, may be derived from the oils of the soybean or the rapeseed. The crude vegetable oil from these sources may be filtered, refined and subjected to several processing steps before the oil may be usable as biodiesel. Additionally, biodiesel may be derived from varying grades of vegetable oils. Such grades include virgin oil, yellow grease, used oils from food processing, or by-products from the edible oil refining process such as soap stock. Each of these sources has varying amounts of free fatty acids and/or glycerides—i.e., mono-, di-, or tri-glycerides—that may be processed into biodiesel.

Of these sources of vegetable oil, soap stock is generally considered the most cost effective source. Soap stock is derived from the crude oil extracted from the soybean or rapeseed. The crude oil of these seeds may be separated into two components: refined oil (which may then be further processed and converted into edible oil) and soap stock. The soap stock may then be acidulated with sulfuric acid to provide a composition having about 70% free fatty acids that may be further processed into biodiesel.

One contemplated method of processing the free fatty acids from these various grades of vegetable oils is the direct transesterification of the free fatty acids in the presence of alkali to produce the fatty acid alkyl esters for use as biodiesel. Such an approach, however, causes the free fatty acids to precipitate as soap, creating an additional recovery step in the contemplated method.

To avoid the precipitation problem, a two-step method for processing the free fatty acids has been proposed. This method can be found in EP 07 708 813 and WO 02/28811, and generally consists of the steps of (1) acid catalyzed esterification of free fatty acids with methanol in the presence of sulfuric acid, and (2) neutralization of the acid catalyst followed by conventional base catalyzed transesterification. These steps can be described by the following reaction scheme.

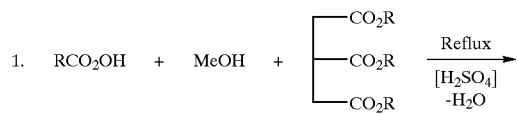

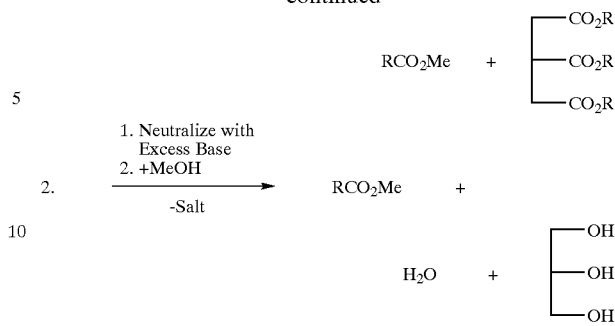

where each R may be the same or different and an aliphatic chain typically found in vegetable or animal oil sources, typically $C_8$ to $C_{22}$.

Even though transesterifications are both acid and base catalyzed, neutralization of the acid catalyst is necessary because acid catalyzed transesterifications typically exhibit slower kinetics than base catalyzed transesterifications, under comparable conditions. The disadvantages of two-step methods as disclosed in EP 07 708 813 and WO 02/28811 are the additional salt waste from neutralization, long cycle times, and a cumbersome recovery scheme of residual free fatty acids, as well as the need to separate methanol from water for recovery and/or waste disposal reasons.

BRIEF SUMMARY OF THE INVENTION

It is therefore an object of the present invention to provide a method of processing free fatty acids from a vegetable or animal oil source into alkylesters in which the salt and aqueous waste is reduced or eliminated.

It is a further object of the present invention to provide a method of processing free fatty acids from a vegetable or animal oil source into alkylesters in which the necessity to separate alkylalcohol (e.g. methanol) from reaction water is reduced or eliminated.

It is a further object of the present invention to provide a method of processing free fatty acids from a vegetable or animal oil source into alkylesters, particularly biodiesel, in which the recovery scheme of residual free fatty acids is conveniently performed or the need for such recovery is eliminated.

These and other advantages are accomplished by subjecting the vegetable or animal oil source to a glycerin source first to convert the free fatty acid content of the oil source into glycerides and in a second step convert the newly created glycerides as well as the originally present glycerides into fatty acid alkyl esters for use as biodiesel. The two-step process of the present invention does not involve a neutralization step or the separation of methanol and water thus simplifying the process of the prior art. The method of the present invention is generally described below where the glycerides originally present in the oil source are represented by the triglyceride, however, it is understood that the glycerides originally present in the oil source may be mono-, di-, and/or triglyicerides

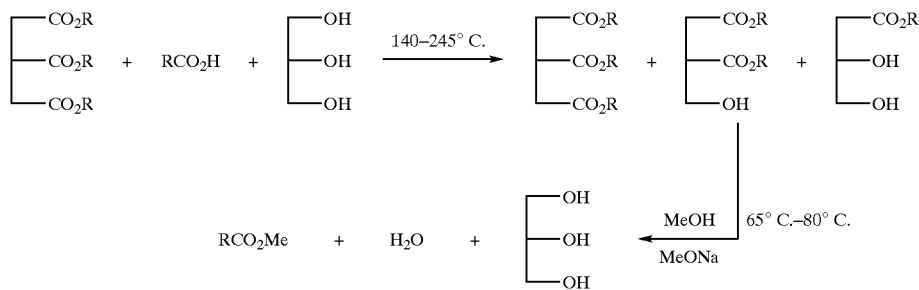

Where each R may be the same or different and an aliphatic chain typically found in vegetable or animal oil sources, typically $C_8$ to $C_{22}$.

DETAILED DESCRIPTION OF THE INVENTION

As noted above, the method of the present invention of processing a vegetable or animal oil source can be represented by the following reaction scheme where the glycerides originally present in the oil source are represented by the triglyceride, however, it is understood that the glycerides originally present in the oil source may be mono-, di-, and/or triglyicerides.

Figure 1:
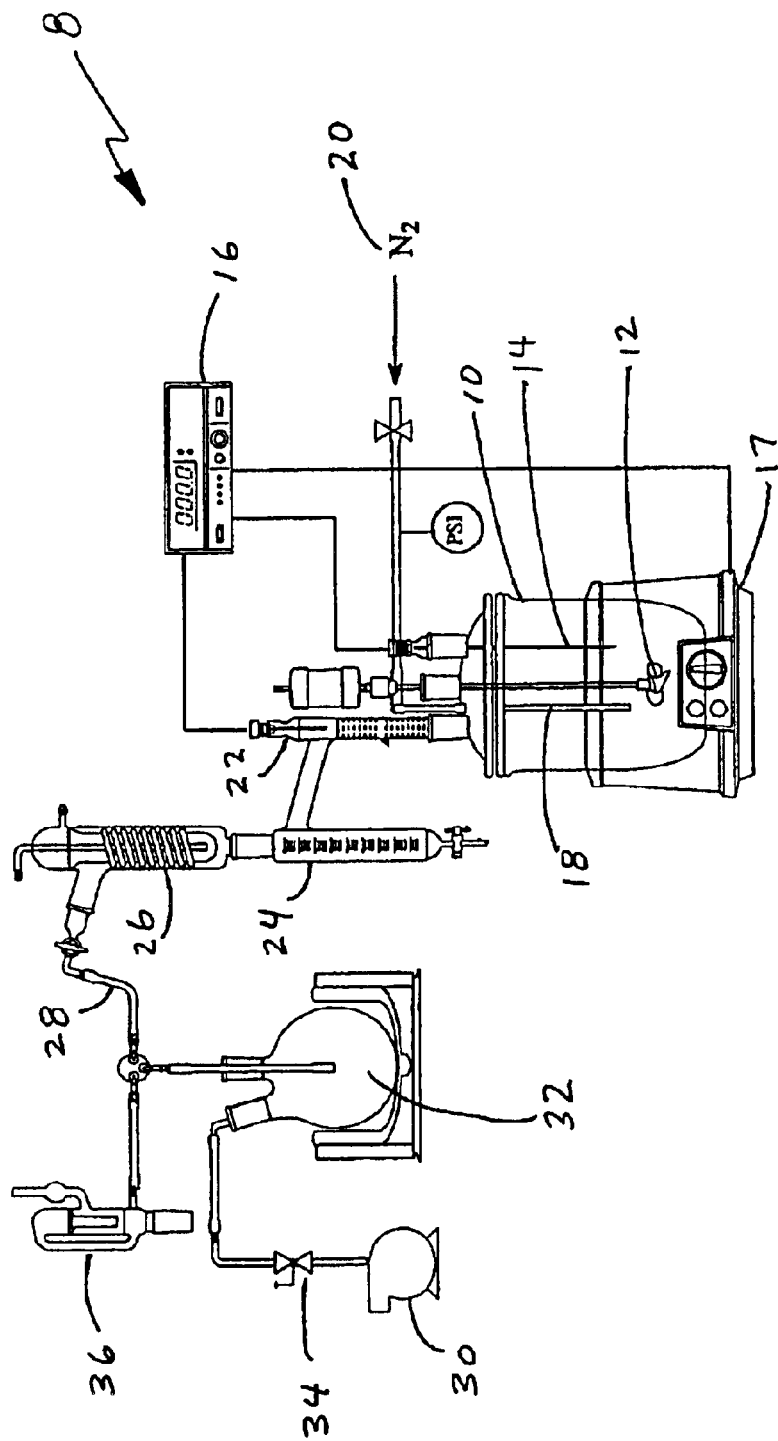
FIG. 1 shows a reaction setup that may be used for performing the method of present invention.

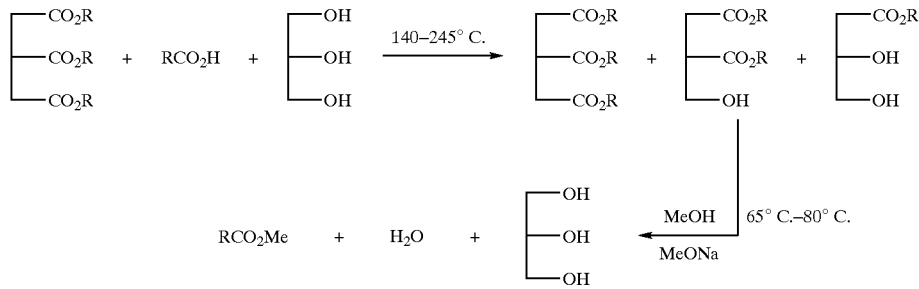

Where each R may be the same or different and may be an aliphatic chain typically found in vegetable or animal oil sources, typically $C_8$ to $C_{22}$. The reaction may be typically conducted in a small-scale batch system as shown in FIG. 1 or more typically in a scaled-up version of the system shown in FIG. 1 for commercial applications. The system 8 of FIG. 1 includes a 1 L resin reactor 10. The reactor 10 was equipped with a Teflon turbine agitator 12, thermocouple 14 with an associated temperature controller 16 and heating mantle 17, nitrogen sparge tube 18 with an associated nitrogen gas source 20, and a packed reflux column 22 (30 cm height and 2,5 cm diameter) attached to a Dean Stark trap 24 with condenser 26. A vacuum line 28 was attached to the top of the condenser 26 which was connected to the vacuum pump 30 via an in-line ice trap 32. The vacuum was controlled with a solenoid 34. A bubbler 36 may also be used. Those skilled in the art will also appreciate that the method of the present invention can be carried out in a continuous mode using standard equipment typically used in chemical processes.

The first step of the reaction in which the free fatty acids are converted into glycerides may be performed at a temperature between about 140° C. to about 245° C., more preferably between about 160° C. to about 200° C., and most preferably at about 180° C. The first step may further be performed at a reduced pressure ranging from about 760 mmHg to about 1 mmHg, under a constant stream of nitrogen, or a combination of both reduced pressure and under a constant stream of nitrogen.

The present invention has been found to be particularly effective when using crude glycerin derived from the methanolysis of vegetable oils or other fats (or recovered from a fat splitting process). Crude glycerin as generated from the methanolysis process contains approximately 80–85% glycerin, 13–18% methanol, about 1–2% water, small amounts of mono-, and diglycerides, as well as residual alkali. However, the method of the present invention is applicable to USP grade glycerin or purified glycerin as well. The glycerin source may be used in a concentration of at least 0.3 equivalent.

The use of crude glycerin provides an opportunity to utilize a process by-product without further purification, and enhances the rate of acid conversion in acidulated soap stock over the use of purified glycerin. This is unexpected since crude glycerin contains substantial amounts of alkaline catalyst. Therefore, a mixture containing acidulated soap stock and crude glycerin will be close to neutral in pH ca. 5.5, whereas a mixture of purified glycerin and soap stock exhibits a pH ca. 2.5–3.5. As reported in "Advanced Organic Chemistry" $4^{th}$ Ed., p. 395, John Wiley & Sons, N.Y., 1992, esterification reactions are acid catalyzed, thus the rate enhancement at the higher pH is unexpected.

The reaction between purified glycerin (e.g., USP grade) and soap stock proceeds (without additional catalyst) to completion (as determined by an acid value of 0.5 or less) at 220–245° C. in approximately 6 hours (see Example 9 below). At a temperature of 180° C., without added catalyst, using USP grade glycerin the esterification is complete after approximately 14 hours (see Example 1 below). A much shorter reaction time between about 9 hours and about 10 hours to completion is realized by using crude glycerin (see Examples 2 and 3 below and see FIG. 2).

The resulting mixture of glycerides is then subjected to a base catalyzed methanolysis, forming methyl esters and glycerin as a by-product. The glycerin generated in this second step of the process can be recycled for use in the first step to form glycerides with the free fatty acids contained in acidulated soap stock or other oil source. In this latter case, no further purification of the recycled glycerin is necessary.

The reaction scheme, in particular the first step of the reaction scheme, may be performed with a catalyst. Contemplated catalysts include but are not limited to organotin compounds (e.g., dibutyltin oxide), organo titanium compounds (e.g., tetrabutyl titanate), alkali acetates, earthalkali acetates, Lewis acids, alkali carbonates, earthalkali carbonates, and combinations thereof.

The advantages of the method of the present invention can be summarized as follows: 1) the use of the unaltered glycerin fraction obtained through alcoholysis of fats and oils; 2) rate enhancement obtained by using the unaltered glycerin fraction containing methanol, water and residual alkali from alcoholysis of fats and oils, rather than purified glycerin; 3) recyclability of glycerin fraction of the method of the invention; 4) the lower processing temperature using the unaltered glycerin fraction from methanolysis of fats and oils; 5) reduced salt formation; and 6) eliminated setup for the separation of excess alcohol (e.g. methanol) and water.

To demonstrate the effectiveness of the above reaction scheme of the present invention, acidulated soap stock samples were subjected to the reaction scheme and the acid value of the reaction products was determined as a function of time. The decreasing acid value demonstrated that the reaction scheme provides a satisfactory method of converting the free fatty acids of the acidulated soap stock into glycerides. The first step of the reaction scheme is preferably carried out to a residual acid value of less than 5 mgKOH/g and more preferably to a residual acid value of between about 0.1 and about 1 mgKOH/g.

EXAMPLE 1

549 g of acidulated soap stock and 108 g of USP grade glycerin were charged into 1 L resin kettle 10 (FIG. 1). The reaction setup 8 of FIG. 1 was used. The resin kettle 10 was heated to the reaction temperature of 180° C. over a period of 60 minutes at atmospheric pressure. After approximately 65 minutes from the time of heat input, vacuum was applied in stages, as reported in Table 1, to assist in the removal of reaction water. A stream of nitrogen was applied in addition to vacuum after 340 minutes of reaction time (as measured from the start of heat input). Samples were taken intermittently to monitor the reaction progress. The reaction was complete (AV=<0.5) after approximately 880 minutes. The collected distillate was measured to 26.11 g, including a thin layer on top of the reaction water, composed of light (C6–C8 fatty acids. The total recovered mass of glyceride mixture was 622.67 g.

Table 1 sets forth the reaction parameters and measured acid values of Example 1 demonstrating the progress of the conversion of the free fatty acids of the soap stock sample into glycerides.

TABLE 1

Reaction parameters for Example 1.

| Time [min] | Reactor [° C.] | Pressure [torr] | Sample [g] | ml 0.1N NaOH | AV [meq/g] | $N_2$ Purge |
|---|---|---|---|---|---|---|
| 0 | 22.0 | 760 | | | 96.60 | no |
| 10 | 61.0 | 760 | | | | no |
| 25 | 121.3 | 760 | | | | no |
| 50 | 169.7 | 760 | | | | no |
| 60 | 180.0 | 760 | | | | no |
| 65 | 179.5 | 350 | | | | no |
| 95 | 179.5 | 350 | | | | no |
| 105 | 179.4 | 350 | 1.1951 | 11.152 | 52.35 | no |
| 125 | 180.1 | 350 | | | | no |
| 130 | 180.9 | 250 | | | | no |
| 145 | 180.6 | 250 | 1.5196 | 11.084 | 40.92 | no |
| 175 | 179.6 | 250 | 1.3568 | 7.850 | 32.46 | no |
| 220 | 179.5 | 250 | 1.4444 | 6.050 | 23.50 | no |
| 280 | 179.8 | 250 | 1.6529 | 4.584 | 15.56 | no |
| 290 | 180.0 | 180 | | | | no |
| 295 | 180.6 | 100 | | | | no |
| 325 | 179.8 | 100 | | | | no |
| 340 | 179.9 | 100 | 2.0267 | 4.056 | 11.23 | 30 mL/hr |
| 400 | 180.1 | 100 | 1.6630 | 2.328 | 7.85 | 30 mL/hr |
| 410 | 180.1 | 90 | | | | 30 mL/hr |
| 420 | 180.1 | 50 | | | | 30 mL/hr |
| 460 | 180.1 | 60 | 2.5286 | 2.138 | 4.74 | 30 mL/hr |
| 640 | 180.0 | 50 | 2.5232 | 0.435 | 0.97 | 30 mL/hr |
| 760 | 180.0 | 50 | 2.6908 | 0.250 | 0.52 | 30 mL/hr |
| 820 | 180.0 | 50 | 3.0017 | 0.248 | 0.46 | 30 mL/hr |
| 880 | 180.0 | 50 | 2.5690 | 0.194 | 0.42 | 30 mL/hr |

EXAMPLE 2

583.9 g of acidulated soap stock and 135.97 g crude glycerin (containing 86% glycerin, and the balance as water, methanol and residual base catalyst), derived from the methanolysis of soybean oil, was charged into a 1 L resin kettle 10 (FIG. 1). The reaction setup 8 of FIG. 1 was used. The pH of the combined materials, as a 10% suspension in a 50/50 mixture by volume of isopropanol and water, was measured to 5.34. The mixture was heated to reaction temperature of 180° C. and vacuum was applied in conjunction with a nitrogen sparge to facilitate the removal of reaction water, as reported in Table 2. The total amount of distillate, including methanol and reaction water, as well as approximately 3.5 ml low molecular weight fatty acids, was measured to 58.58 g. The recovered weight of glycerides was 654.68 g (90.9% based on total mass input). In general, this example shows that by using the crude glycerin, the duration of vacuum application in combination with nitrogen sparging may be considerably shorter, and that the overall reaction time to reach a comparable acid value was significantly reduced (880 min vs. 615 min), as compared with Example 1.

Table 2 sets forth the reaction parameters and measured acid values of Example 2 demonstrating the progress of the conversion of the free fatty acids of the soap stock sample into glycerides.

TABLE 2

Reaction parameters for Example 2.

| Time [min] | Reactor [° C.] | Pressure [torr | Sample [g] | ml 0.1N NaOH | AV [meq/g] | $N_2$ Purge |
|---|---|---|---|---|---|---|
| 0 | 20.4 | 760 | | | 94.10 | no |
| 15 | 62.0 | 760 | | | | no |
| 30 | 106.4 | 760 | | | | no |

TABLE 2-continued

Reaction parameters for Example 2.

| Time [min] | Reactor [° C.] | Pressure [torr] | Sample [g] | ml 0.1N NaOH | AV [meq/g] | N₂ Purge |
|---|---|---|---|---|---|---|
| 45 | 131.2 | 760 | | | | no |
| 60 | 157.1 | 760 | | | | no |
| 75 | 177.0 | 760 | | | | no |
| 80 | 180.4 | 760 | | | | no |
| 90 | 181.0 | 760 | | | | no |
| 105 | 180.3 | 760 | | | | no |
| 120 | 180.5 | 760 | 1.3349 | 12.848 | 53.99 | no |
| 135 | 180.7 | 760 | | | | no |
| 140 | 180.3 | 350 | | | | no |
| 150 | 180.4 | 350 | 1.8577 | 13.610 | 41.10 | no |
| 170 | 180.1 | 350 | | | | no |
| 190 | 180.0 | 350 | 1.6703 | 9.378 | 31.50 | no |
| 195 | 179.7 | 250 | | | | no |
| 235 | 179.5 | 250 | 2.3303 | 8.814 | 21.22 | no |
| 240 | 180.8 | 170 | | | | no |
| 245 | 181.7 | 100 | | | | no |
| 305 | 180.0 | 100 | 1.8723 | 4.284 | 12.84 | no |
| 365 | 180.5 | 100 | 2.3596 | 3.495 | 8.31 | no |
| 370 | 178.7 | 40 | | | | 30 mL/hr |
| 435 | 180.0 | 40 | | | | 30 mL/hr |
| 465 | 179.9 | 40 | 2.2633 | 1.040 | 2.58 | 30 mL/hr |
| 615 | 180.1 | 40 | 2.8797 | 0.182 | 0.35 | 30 mL/hr |

EXAMPLE 3

Example 3 demonstrates that by utilizing the combination of vacuum and nitrogen sparge earlier in the process, cycle time can be reduced further, without negatively affecting the final product, e.g., by removing raw material from the reactor resulting in decreased yields. 528.5 g of acidulated soap stock were combined with 124.4 g of crude glycerin and processed as under example 1–2. The pH of the reaction mixture immediately after combing the raw materials was measured to 5.04. The total weight of distillate was measured to 54.77 g and the isolated yield of glycerides was 589.68 g (90.3% based on total mass input).

Table 3 sets forth the reaction parameters and measured acid values of Example 3 demonstrating the progress of the conversion of the free fatty acids of the soap stock sample into glycerides.

TABLE 3

Reaction parameters for Example 3.

| Time [min] | Reactor [° C.] | Pressure [torr] | Sample [g] | ml 0.1N NaOH | AV [meq/g] | N₂ Purge |
|---|---|---|---|---|---|---|
| 0 | 20.4 | 760 | | | 104.20 | no |
| 15 | 71.4 | 760 | | | | no |
| 30 | 111.2 | 760 | | | | no |
| 35 | 121.0 | 760 | | | | no |
| 45 | 140.5 | 760 | | | | no |
| 60 | 166.0 | 760 | | | | no |
| 75 | 180.4 | 760 | 1.6758 | 24.830 | 83.12 | no |
| 90 | 179.8 | 760 | | | | no |
| 105 | 179.4 | 760 | 1.5155 | 17.476 | 64.69 | no |
| 135 | 180.3 | 760 | 1.1391 | 10.158 | 50.03 | no |
| 145 | 181.4 | 350 | | | | no |
| 165 | 180.0 | 350 | 1.8234 | 12.272 | 37.76 | no |
| 195 | 180.2 | 350 | | | | no |
| 200 | 179.5 | 250 | | | | no |
| 225 | 179.7 | 250 | 2.0317 | 8.580 | 23.69 | no |
| 230 | 179.9 | 160 | | | | no |
| 235 | 180.1 | 100 | | | | no |
| 255 | 179.1 | 100 | | | | no |
| 285 | 180.5 | 100 | 2.3684 | 5.854 | 13.87 | 30 mL/hr |

TABLE 3-continued

Reaction parameters for Example 3.

| Time [min] | Reactor [° C.] | Pressure [torr] | Sample [g] | ml 0.1N NaOH | AV [meq/g] | N₂ Purge |
|---|---|---|---|---|---|---|
| 290 | 179.9 | 40 | | | | 30 mL/hr |
| 345 | 179.8 | 40 | 2.0354 | 2.452 | 6.76 | 30 mL/hr |
| 405 | 180.1 | 40 | 2.1778 | 0.802 | 2.07 | 30 mL/hr |
| 465 | 179.9 | 40 | 2.3043 | 0.190 | 0.46 | 30 mL/hr |
| 525 | 180.0 | 40 | 1.9636 | 0.138 | 0.39 | 30 mL/hr |

Figure 2:
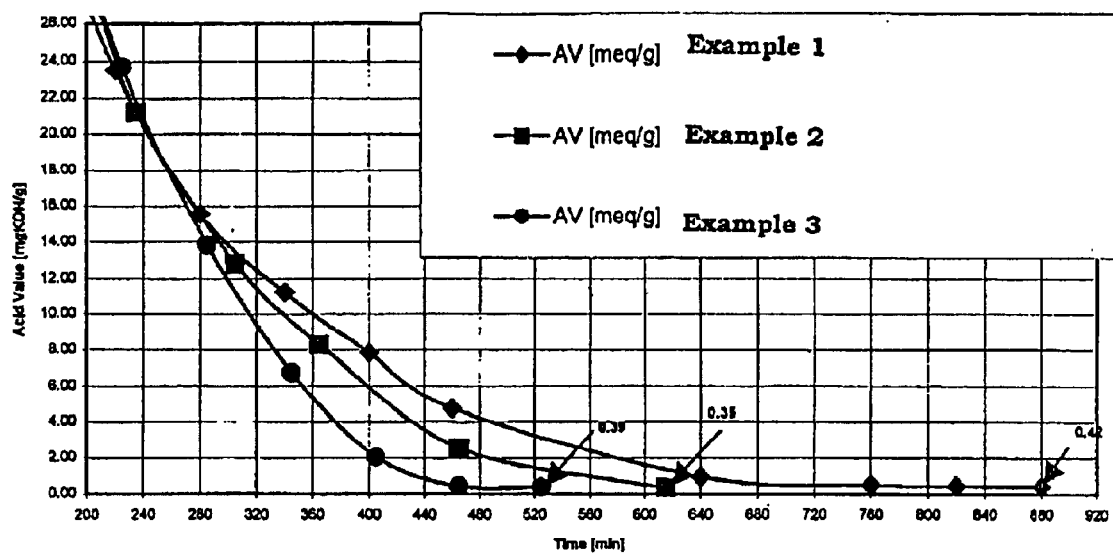
FIG. 2 shows the acid values as a function of time for three examples of the present invention.

FIG. 2 compares the rate of conversion of the free fatty acids of the soap stock for Examples 1, 2, and 3 and demonstrates that the conditions of Example 3 provide the most accelerated conversion.

EXAMPLE 4

Example 4 demonstrates the effect of a reduced glycerin charge. The amount of 520.2 g of acidulated soap stock and 91.8 g of crude glycerin (15 wt % effective glycerin) were charged into a 1 L resin kettle 10 (FIG. 1) and treated as in the previous examples. To maintain a similar pH as in Examples 1 and 2, an adjustment was made using 7.35 g 25% solution of sodium methoxide in methanol. The total amount of distillate recovered was 53.5 g and the glyceride yield was 548.71 g.

Table 4 sets forth the reaction parameters and measured acid values of Example 4 demonstrating the progress of the conversion of the free fatty acids of the soap stock sample into glycerides.

TABLE 4—Reaction parameters for Example 4.

| Time [min] | Reactor [° C.] | Press [torr] | Sample [g] | ml 0.1N NaOH | AV [meq/g] | N₂ Purge |
|---|---|---|---|---|---|---|
| 0 | 20.4 | 76 | | | 104.20 | no |
| 15 | 72.8 | 76 | | | | no |
| 25 | 101.5 | 76 | | | | no |
| 30 | 112.5 | 76 | | | | no |
| 35 | 123.2 | 76 | | | | no |
| 40 | 133.1 | 76 | | | | no |
| 50 | 151.5 | 76 | | | | no |
| 65 | 173.2 | 76 | | | | no |
| 75 | 181.2 | 76 | | | | no |
| 90 | 180.8 | 76 | 1.2199 | 15.8780 | 73.02 | no |
| 100 | 179.9 | 76 | | | | no |
| 105 | 180.2 | 76 | | | | no |
| 110 | 181.0 | 76 | | | | no |
| 120 | 179.5 | 76 | 1.3880 | 13.4200 | 54.24 | no |
| 130 | 179.2 | 76 | | | | no |
| 135 | 179.7 | 55 | | | | no |
| 140 | 181.3 | 35 | | | | no |
| 160 | 178.8 | 35 | | | | no |
| 165 | 178.4 | 25 | | | | no |
| 180 | 180.6 | 25 | 1.3293 | 8.2000 | 34.61 | no |
| 215 | 179.4 | 25 | | | | no |
| 240 | 180.4 | 25 | 1.3045 | 4.9940 | 21.48 | no |
| 245 | 181.6 | 10 | | | | no |
| 300 | 179.7 | 10 | 1.2125 | 2.7960 | 12.94 | no |
| 310 | 180.2 | 4 | | | | no |
| 360 | 179.9 | 4 | 1.4515 | 2.1060 | 8.14 | no |
| 370 | 179.7 | 4 | | | | 30 mL/Hr |
| 420 | 180.1 | 4 | 1.3065 | 0.5260 | 2.26 | 30 mL/Hr |
| 570 | 180 | 4 | 2.0472 | 0.1440 | 0.39 | 30 mL/Hr |

EXAMPLE 5

Example 5 is analogous to Example 4, but without the pH adjustment. The pH of the combined glycerin and soap stock was 5.03. The nitrogen sparge for the last hour was increased from 30 mL/hr to 60 mL/hr. The final amount of distillate collected was 55.25 g and 552.73 g of glycerides were recovered.

Table 5 sets forth the reaction parameters and measured acid values of Example 5 demonstrating the progress of the conversion of the free fatty acids of the soap stock sample into glycerides.

TABLE 5

Reaction parameters for Example 5.

| Time [min] | Reactor [° C.] | Press [torr] | Sample [g] | ml 0.1N NaOH | AV [meq/g] | $N_2$ Purge |
|---|---|---|---|---|---|---|
| 0 | 24.8 | 760 | | | 104.20 | no |
| 15 | 82.5 | 760 | | | | no |
| 40 | 139.6 | 760 | | | | no |
| 60 | 173.2 | 760 | | | | no |
| 70 | 180.1 | 760 | | | | no |
| 75 | 180.1 | 760 | 1.0755 | 17.1360 | 89.38 | no |
| 90 | 179.2 | 760 | | | | no |
| 105 | 180.2 | 760 | | | | no |
| 120 | 180.1 | 760 | 0.8893 | 9.4660 | 59.71 | no |
| 130 | 180.6 | 760 | | | | no |
| 135 | 179.5 | 350 | | | | no |
| 165 | 178.6 | 350 | 0.9661 | 7.4100 | 43.03 | no |
| 205 | 182.7 | 350 | 1.5781 | 8.9740 | 31.90 | no |
| 210 | 180.0 | 100 | | | | no |
| 300 | 181.3 | 100 | 1.3542 | 4.4440 | 18.41 | no |
| 310 | 180.2 | 40 | | | | 30 mL/Hr |
| 420 | 180.0 | 40 | 1.8068 | 2.2180 | 6.89 | 30 mL/Hr |
| 600 | 180.1 | 4 | 1.8589 | 0.3300 | 1.00 | 30 mL/Hr |
| 610 | 180.1 | 5 | | | | 60 mL/Hr |
| 660 | 180.0 | 5 | 1.8270 | 0.1280 | 0.39 | 60 mL/Hr |

EXAMPLE 6

Example 6 is a comparative reaction which highlights the fact that the glycerolysis can be carried out with a variety of raw material streams such as yellow grease and acidulated glycerin (recycled glycerin from soy oil methanolysis but without alkali or methanol), and can be subjected to a conventional esterification catalysis. 498.1 g yellow grease and 50.0 g acidulated glycerin were charged together with 1.0 g of Dibutyltinoxide into a 1 L resin kettle 10 (FIG. 1) and heated to a reaction temperature of 200° C. When the reaction temperature reached 200° C., a vacuum of 250 mmHg was applied. After approximately 6 hours, the acid value was measured to be 0.5 AV, and about 5.5 mL liquid had been collected in the Dean-Stark trap. The reaction mixture was cooled to an appropriate temperature to safely add 116 g of methanol and 7.5 g of a 25% solution of sodium methoxide in methanol. The reactor was then heated to 77° C. for 2 hours while agitating. Heating was discontinued and the mixture was allowed to settle. A total of 147.43 g of glycerin containing phase was removed from the bottom of the mixture. The remaining material was stripped at 60° C. to remove excess methanol. The remaining crude ester phase was then washed with 110 mL of water, stirred for 5 minutes and let settle for about 30 minutes, before draining the aqueous layer from the bottom. This procedure was repeated twice more with the same amount of water. The combined aqueous phases were collected and weighed (408.2 g). The washed ester was then stripped at about 60° C. under vacuum until dry (final water content 430 ppm). The yield of biodiesel esters was 366.3 g.

EXAMPLE 7

684 g of acidulated soap stock and 163 g of crude glycerin were charged together with 3.5 g of potassium acetate (pH of mixture was 5.48) into a 1 L resin kettle 10 (FIG. 1). The reaction mixture was heated to temperature and vacuum and nitrogen was applied as in the previous examples, as reported in Table 6. The final acid value was 0.21, with 72.56 g distillate collected, and a glyceride yield of approximately 758.76 g (accounting for sampling during the reaction).

After cooling the reaction, 120 g of methanol and 5.7 g of sodium methoxide solution (25% in methanol) was added, and the reactor was heated to 65–68° C. for 1.25 hours, after which the reaction mixture was allowed to settle for 1.25 hours. The glycerin fraction was then removed from the bottom of the reactor (198.33 g), followed by the removal of excess methanol in vacuo (17.66 g). The reactor was then charged with 22 g distilled water and agitated for 10 minutes. After a settling time of 3 hours, 52.57 g aqueous phase was removed (overnight an additional 10.57 g of ester was recovered from the initial aqueous phase). 254.95 g of the ester, prepared in this manner, was distilled under vacuum (10–20 mmHg) to give 224.61 g of nearly colorless methyl ester product Table 6 sets forth the reaction parameters and measured acid values of Example 7 demonstrating the progress of the conversion of the free fatty acids of the soap stock sample into glycerides.

TABLE 6

Reaction parameters for Example 7.

| Time [min] | Reactor ° C. | Press [torr] | Sample [g] | ml 0.1N NaOH | AV [meq/g] | $N_2$ Purge |
|---|---|---|---|---|---|---|
| 0 | 16.4 | 760 | | | 112.00 | |
| 30 | 81.6 | 760 | | | | |
| 65 | 136.7 | 760 | | | | |
| 95 | 169.9 | 760 | | | | |
| 100 | 172.2 | 760 | | | | |
| 110 | 177.4 | 760 | | | | |
| 115 | 180.2 | 760 | | | | |
| 130 | 182.0 | 760 | 1.7476 | 17.350 | 55.70 | |
| 155 | 180.6 | 760 | | | | |
| 160 | 180.1 | 400 | | | | |
| 165 | 180.0 | 350 | | | | |
| 170 | 182.2 | 250 | | | | |
| 190 | 180.3 | 250 | 2.0585 | 12.072 | 32.90 | |
| 200 | 179.9 | 250 | | | | 30 mL/Hr |
| 230 | 180.4 | 250 | | | | 30 mL/Hr |
| 230 | 178.8 | 40 | | | | 30 mL/Hr |
| 250 | 181.0 | 40 | | | | 30 mL/Hr |
| 255 | 180.0 | 40 | 2.3054 | 6.766 | 16.46 | 30 mL/Hr |
| 300 | 180.1 | 40 | | | | 30 mL/Hr |
| 370 | 179.6 | 40 | 3.2247 | 2.268 | 3.95 | 30 mL/Hr |
| 435 | 179.6 | 40 | 4.0911 | 0.301 | 0.41 | 30 mL/Hr |
| 480 | 179.6 | 40 | 2.7252 | 0.100 | 0.21 | 30 mL/Hr |

EXAMPLE 8

541.29 g of acidulated soap stock and 108.5 g USP glycerin were charged together into a 1 L resin kettle 10 (FIG. 1) and heated to reaction temperature of 180° C. When the reaction temperature reached 180° C., a gradual vacuum was applied. Tetrabutyltitanate (Tyzor® TBT) was injected blow the liquid level in the reactor twice through a syringe, once at 270 min and again at 405 min elapsed reaction time. After approximately 12 hours, the acid value was measured to be 0.94 AV, and about 24.15 g distillate had been collected in the Dean-Stark trap.

Table 7 sets forth the reaction parameters and measured acid values for Example 8.

TABLE 7

Reaction parameters for Example 8.

| Time [min] | Reactor [° C.] | Pressure [torr] | Sample [g] | ml 0.1N NaOH | AV [meq/g] | N$_2$ Purge |
|---|---|---|---|---|---|---|
| 0 | 33 | 760 | | | 96.60 | no |
| 15 | 77.6 | 760 | | | | no |
| 30 | 128.6 | 760 | | | | no |
| 45 | 160.6 | 760 | | | | no |
| 60 | 177.5 | 760 | 1.7029 | 25.616 | 84.39 | no |
| 65 | 180.3 | 500 | | | | no |
| 70 | 181.7 | 450 | | | | no |
| 90 | 180.5 | 450 | 1.1478 | 13.330 | 65.15 | no |
| 120 | 180.0 | 450 | 1.4322 | 12.616 | 49.42 | no |
| 150 | 180.1 | 450 | | | | no |
| 165 | 180.3 | 450 | | | | no |
| 180 | 179.5 | 450 | 1.5293 | 8.768 | 32.16 | no |
| 185 | 180.5 | 370 | | | | no |
| 188 | 181.1 | 350 | | | | no |
| 270 | 180.1 | 350 | 1.7471 | 5.120 | 16.44 | no |
| 285 | 180.0 | 350 | | | | no |
| 300 | 180.5 | 350 | | | | no |
| 302 | 180.5 | 290 | | | | no |
| 305 | 181.1 | 250 | | | | no |
| 330 | 180.5 | 250 | 1.5455 | 3.466 | 12.58 | no |
| 345 | 178.8 | 150 | | | | 30 mL/Hr |
| 360 | 180.7 | 100 | | | | 30 mL/Hr |
| 390 | 180.1 | 100 | 1.9501 | 3.036 | 8.73 | 30 mL/Hr |
| 405 | 180.1 | 60 | | | | no |
| 420 | 180.1 | 60 | | | | no |
| 450 | 179.4 | 60 | 2.1709 | 2.274 | 5.88 | no |
| 510 | 179.7 | 50 | 1.4046 | 0.944 | 3.77 | no |
| 690 | 180.1 | 40 | 2.6843 | 0.885 | 1.85 | no |
| 710 | 179.6 | 15 | | | | 30 mL/Hr |
| 740 | 179.9 | 15 | 2.4716 | 0.416 | 0.94 | 30 mL/Hr |

EXAMPLE 9

250.7 g yellow grease (AV 29.5 mgKOH/g) was charged together with 14.7 g of acidulated glycerin and heated to a reaction temperature of 230° C. After 45 minutes into the reaction, a vacuum was applied at 23 inches to facilitate removal of water. After 8 hours reaction time the acid value was 0.37.

EXAMPLE 10

515.0 g acidulated soap stock (acid value 126 mgKOH/g) were charged together with 133.1 g of acidulated glycerin and heated to 230° C. After 45 minutes at 230° C. vacuum was applied at 20 inches to assist in the removal of reaction water. After a total reaction time of 7.5 hours, the acid value was 0.34.

Table 8 summarizes the reaction parameters and AV results for Examples 1 through 10.

TABLE 8

Summary of results for Examples 1–10.

| Example | Wt % Glycerin | Final AV | Reaction Time [min] | Rxn Temp. [° C.] | Added Catalyst |
|---|---|---|---|---|---|
| 1 | 20 (P) | 0.42 | 880 | 180 | None |
| 2 | 20 (C) | 0.35 | 615 | 180 | None |
| 3 | 20 (C) | 0.39 | 525 | 180 | None |
| 4 | 15 (C) | 0.39 | 570 | 180 | None |
| 5 | 15 (C) | 0.39 | 660 | 180 | None |
| 6* | 10 (R) | 0.50 | 360 | 200 | 0.5 wt % DBTO |
| 7 | 20 (C) | 0.41 | 435 | 180 | 0.5 wt % KAc |
| 8 | 20 (P) | 0.94 | 740 | 180 | 0.2 wt % TBT |
| 9* | 5.75 (R) | 0.37 | 480 | 230 | None |
| 10 | 25 (R) | 0.34 | 450 | 230 | None | n.d. = not determined
* = Reaction run with yellow grease (12 wt % Free fatty acid) as comparison
DBTO = Dibutyl tinoxide
TBT = Tetrabutyltitanate
Crude glycerin ca. 86% pure (C)
USP glycerin > 99.9% pure (P)
Glycerin recycled ca. 98% pure (R)

EXAMPLE 11

Example 11 demonstrates the effectiveness of the method of the present invention on a large scale. To 1,670 lbs. of acidulated soap stock, 304 lbs. of glycerol were added. The mixture was agitated and heated to 180° C. reaction temperature, while removing residual methanol from the recycled glycerin as well as reaction water from the formation of glycerides. The removal of reaction water was facilitated by the use of vacuum (40 mmHg max.) and nitrogen sparging. After approximately 16 hours (including approximately 2 hours heat up time), an acid value of 1.0 was reached. The reaction was cooled to <60° C. and methanol was charged (732 lbs.) as well as 45 lbs. of sodium methylate (21% solution in methanol). The reactor was heated to 68° C. and maintained at this temperature for one hour. Agitation was then stopped and the glycerol phase was allowed to settle at the bottom of the reactor for approximately 1 hour. After draining the glycerol phase, residual methanol was removed via vacuum, and 20 lbs. of wash water were added and the mixture was stirred for 15 min and then left to settle. The aqueous phase was removed from the bottom of the reactor. The reactor was then evacuated to remove residual water resulting in a crude methyl ester product. The crude methyl ester was then subjected to vacuum distillation yielding approximately 1,429 lbs. of nearly colorless distilled ester.

EXAMPLE 12

Example 12 demonstrates the effectiveness of the method of the present invention on a large scale. To 1,521 lbs. of acidulated soap stock, 380 lbs. of glycerol were added, consisting of 304 lbs. crude glycerol from the methanolysis of soybean oil and 76 lbs. of the recycled glycerin fraction of the previous large scale run of Example 10. The mixture was agitated and heated to 180° C. reaction temperature, while removing residual methanol from the recycled glycerin as well as reaction water from the formation of glycerides. The removal of reaction water was facilitated by the use of vacuum (40 mmHg max.) and nitrogen sparging. After approximately 12 hours (including approximately 2 hours heat up time), an acid value of 0.5 was reached. The reaction was cooled to <60° C. and methanol was charged (434 lbs.) as well as 41 lbs. of sodium methylate (21% solution in methanol). The reactor was heated to 68° C. and maintained at this temperature for one hour. Agitation was then stopped and the glycerol phase was allowed to settle at the bottom of the reactor for approximately 1 hour. After draining the glycerol phase residual methanol was removed via vacuum, and 20 lbs. of wash water were added and the mixture was stirred for 15 minutes and then left to settle. The aqueous phase was removed from the bottom of the reactor. The reactor was then evacuated to remove residual water resulting in a crude methyl ester product. The crude methyl ester was then subjected to vacuum distillation yielding approximately 1,370 lbs. of nearly colorless distilled ester.

While particular elements, embodiments and applications of the present invention have been shown and described, it will be understood that the invention is not limited thereto since modifications may be made by those skilled in the art, particularly in light of the foregoing teachings. Therefore, it is understood that the embodiments described above are merely for illustrative purposes and are not intended to limit the spirit and scope of the invention, which is defined by the following claims as interpreted according to the principles of patent law, including the doctrine of equivalents.

What is claimed is:

1. A method of making an alkylester comprising the following steps:
   providing an oil source, the oil source including free fatty acids and/or glycerides;
   providing a glycerol source of at least 0.3 equivalent;
   contacting the glycerol source and oil source for a sufficient time for effective conversion of the free fatty acids and glycerides into a mixture of mono-, di-, and tri-glycerides;
   providing methanol in an excess between about 1.0 equivalents to about 3 equivalents;
   reacting the mixture of glycerides with the methanol for an effective conversion of glycerides into fatty acid alkyl esters;
   recovering the fatty acid alkyl esters.

2. The method of claim 1 wherein the step of contacting the glycerol source and oil source is performed in the presence of a catalyst.

3. The method of claim 2 wherein the catalyst is selected from the group consisting of organotin compounds, organo titanium compounds, alkali acetates, earthalkali acetates, lewis acids, alkali carbonates, earthalkali carbonates, and combinations thereof.

4. The method of claim 3 wherein the catalyst is dibutyltin oxide.

5. The method of claim 3 wherein the catalyst is tetrabutyl titanate.

6. The method of claim 1 wherein the glycerol source is USP grade glycerol or purified glycerol.

7. The method of claim 1 wherein the glycerol source is crude glycerol recovered from a fat splitting or methanolysis of vegetable oil.

8. The method of claim 1 further comprising the step of
   recovering the glycerol produced from the reaction of glycerides with the methanol;
   and wherein the glycerol source includes at least in part the recycled glycerol without further purification.

9. The method of claim 1 wherein the step of contacting the glycerol source and oil source is performed at a temperature between about 140° C. to 245° C.

10. The method of claim 9 wherein the temperature is between about 160° C. to 200° C.

11. The method of claim 10 wherein the temperature is about 180° C.

12. The method of claim 1 wherein the step of contacting the glycerol source and oil source is performed at a reduced pressure ranging from about 760 mmHg to 1 mmHg.

13. The method of claim 1 wherein the step of contacting the glycerol source and oil source is performed at a reduced pressure and under a constant stream of nitrogen.

14. The method of claim 1 wherein the step of contacting the glycerol source and oil source is performed under a constant stream of nitrogen.

15. The method of claim 1 wherein the method is performed in a batch process.

16. The method of claim 1 wherein the method is performed in a continuous process.

17. The method of claim 1 wherein the step of contacting the glycerol source and oil source is carried out to a residual acid value of below 5 (mgKOH/g).

18. The method of claim 17 wherein the step of contacting the glycerol source and oil source is carried out to a residual acid value of about 0.1 to about 1 (mgKOH/g).

* * * * *